US012698192B2

(12) United States Patent
Naber

(10) Patent No.: US 12,698,192 B2
(45) Date of Patent: Aug. 4, 2026

(54) UNDERFLOOR LIFTING PLATFORM FOR LIFTING VEHICLES

(71) Applicant: AUTOPSTENHOJ GMBH, Rheine (DE)

(72) Inventor: Wolfgang Naber, Neuenkirchen (DE)

(73) Assignee: AUTOPSTENHOJ GMBH, Rheine (DE)

( * ) Notice: Subject to any disclaimer, the term of this patent is extended or adjusted under 35 U.S.C. 154(b) by 325 days.

(21) Appl. No.: 18/360,201

(22) Filed: Jul. 27, 2023

(65) Prior Publication Data

US 2024/0034606 A1 Feb. 1, 2024

(30) Foreign Application Priority Data

Jul. 28, 2022 (EP) .................................... 22187420

(51) Int. Cl.
*B66F 7/20* (2006.01)
*B66F 7/28* (2006.01)
*B66F 17/00* (2006.01)

(52) U.S. Cl.
CPC ................ *B66F 17/00* (2013.01); *B66F 7/20* (2013.01); *B66F 7/28* (2013.01)

(58) Field of Classification Search
CPC .... B66F 17/00; B66F 7/20; B66F 7/28; B66F 7/26
See application file for complete search history.

(56) References Cited

U.S. PATENT DOCUMENTS 1,841,900 A 1/1932 Lunati
3,393,772 A * 7/1968 Pelouch .................... B66F 7/18 187/219

(Continued)

FOREIGN PATENT DOCUMENTS

CH 306745 4/1955
CN 211169719 8/2020

(Continued)

OTHER PUBLICATIONS

European Search Report for 22187420.9 issued Jan. 24, 2023, 7 pages.

*Primary Examiner* — Lee D Wilson
(74) *Attorney, Agent, or Firm* — Chrisman Gallo Tochtrop LLC

(57) ABSTRACT

An underfloor lifting platform (100) for lifting vehicles comprising a canister (200) configured to be arranged underground and a first and a second cylinder piston units (300*a*, 300*b*). The first and the second cylinder piston units (300*a*, 300*b*) are movable along a vertical direction (X). The underfloor lifting platform (100) comprises a first and a second bearing (400) configured to slidably guide the first and the second cylinder piston units (300*a*, 300*b*). The underfloor lifting platform (100) comprises a plate (401) including a central aperture (402) for receiving the cylinder liner (302) in contact therethrough and through holes (403) surrounding the central aperture (402). The underfloor lifting platform (100) comprises a sleeve (404) defining a passage for receiving the cylinder liner (302) in sliding contact therethrough and connecting portions (405) integral to the sleeve (404). The underfloor lifting platform (100) comprises connectors (406) operatively inserted into the through holes (403) to engage the connecting portions (405) so to fasten the plate (401) to the sleeve (404).

21 Claims, 7 Drawing Sheets

(56) References Cited

U.S. PATENT DOCUMENTS

| | | | | |
|---|---|---|---|---|
| 11,731,866 | B2 * | 8/2023 | Hoekstra | B66F 7/0666 254/122 |
| 12,280,995 | B2 * | 4/2025 | Marinelli | B66F 7/065 |
| 2019/0256333 | A1 * | 8/2019 | Stapensea | B66F 7/20 |
| 2021/0387838 | A1 * | 12/2021 | Green | B66F 7/16 |
| 2023/0011902 | A1 * | 1/2023 | Denzik | F16C 11/02 |
| 2024/0034606 | A1 * | 2/2024 | Naber | B66F 7/20 |

FOREIGN PATENT DOCUMENTS

| | | |
|---|---|---|
| DE | 19824081 | 12/1999 |
| DE | 202007002790 | 6/2008 |
| DE | 102011101159 | 11/2012 |
| DE | 102012002902 | 8/2013 |
| JP | H0625300 | 5/1994 |

* cited by examiner

UNDERFLOOR LIFTING PLATFORM FOR LIFTING VEHICLES

FIELD OF THE INVENTION

The present invention relates to an underfloor lifting platform for lifting vehicles.

BACKGROUND OF THE INVENTION

Such lifting devices are used for lifting motor vehicles when some maintenance is needed.

The known lifting devices comprise lifting cylinders configured to lift a pair of rails where the vehicle is collocated. Normally, the lifting cylinders are arranged in a basin or cassette embedded in the floor in such a way that the piston rods are vertically lifted out from the cassette while the cylinder tubes remain below the floor surface.

In some cases, for each cylinder, a cassette is embedded in the floor as, for example, shown in DE102012002902A1 or in DE102011101159B4. Other examples of lifting devices are provided in CH306745A, JPHO6 25300U, CN211169719U and U.S. Pat. No. 1,841,900A. Alternatively, a single cassette containing a pair of cylinders can be embedded in the floor.

In order to guide the lifting movement of the piston rods, it is known to provide, for each cylinder, a bearing connected to the cassette and to the floor and configured to slidably guide the cylinders in their movement along the vertical direction.

A similar lifting device is known from DE19824081C2, US20210387838A1 and from DE202007002790U1.

Each bearing comprises a plate with a central aperture for receiving the cylinder in sliding contact therethrough and a sleeve integral (for example casted) to the plate and configured to define a passage for receiving the cylinder.

When a vehicle is loaded on the rails, due to the load ratio between the front and the rear part of the vehicle itself or due to its unfortunate positioning, the cylinders undergo to huge torque. The torque acts on the bearings that are connected to the cassette. In particular, the torque is derived only by the plate fixed to the canister and it creates flexible deformation so, in case of cylinder hose burst, the deformation can get critically above the limit one causing a collapse of the entire underfloor lifting platform.

BRIEF SUMMARY OF THE INVENTION

The invention addresses the problem of realizing an underfloor lifting platform mechanically stronger and more reliable, especially in the event of a cylinder hose burst.

A further purpose of the present invention thus appears to be to make available an underfloor lifting platform whose components, especially bearings, are easy to manufacture and apply to the underfloor lifting platform.

The specified technical purposes are substantially achieved by an underfloor lifting platform comprising the technical features set in one or more of the accompanying claims. The dependent claims correspond to possible embodiments of the invention.

In particular, the technical purposes are achieved by an underfloor lifting platform for lifting vehicles comprising a canister configured to be arranged underground to define an in-ground environment.

The underfloor lifting platform also comprises a first and a second cylinder piston units operatively arranged within the canister in an upside configuration with the piston edge abutting the bottom of the canister.

The first and the second cylinder piston units is movable along a vertical direction. In this situation the cylinder liner of the first and the second cylinder piston unit move in extraction and retraction from the canister.

The underfloor lifting platform also comprises load supports, for example rails, arranged at the upper ends of each cylinder liner of the cylinder piston units in order to accommodate a vehicle to move it up and down along the vertical direction.

Inside the in-ground environment defined by the canister, there is a handling unit, for example a hydraulic unit, configured to move the first and a second cylinder piston units so as to move load supports, and so the vehicle, along the vertical direction.

The underfloor lifting platform also comprises a first and a second bearing operatively associated to an upper region of the canister and configured to slidably guide a corresponding cylinder liner of the first and a second cylinder piston units in their movement along the vertical direction.

According to an aspect of the present disclosure the first and a second bearing are flush to the floor and fixed to the canister in such a way to not move vertically along the vertical direction.

Each bearing comprises a plate including a central aperture for receiving the cylinder liner in contact therethrough and through holes surrounding the central aperture.

According to a preferred embodiment, the plate is realized in aluminum. Each bearing also comprises a sleeve elongated along a longitudinal axis and including a lateral wall surrounding the longitudinal axis to define a passage for receiving the cylinder liner in sliding contact therethrough.

The sleeve has an upper hollow tubular portion operatively inserted into the central aperture of the plate. The upper hollow tubular portion has an axial extension slightly higher than a thickness of the plate so that the upper hollow tubular portion has a circular rim arranged substantially flush with an upper surface of the plate.

The sleeve also comprises connecting portions integral to the lateral wall and surrounding the passage.

The connecting portions define ribs radially protruding from an outer surface of the lateral wall of the sleeve. More in particular, each connecting portion is joint to the lateral wall by a smooth/rounded junction and the connecting portions are angularly distributed around the passage.

As shown in the attached figures, also the through holes of the plate could be angularly distributed around the central aperture in such a way that when the sleeve is positioned below the plate, each through hole is vertically aligned with a corresponding connecting portion.

In this situation, the plate and the sleeve are removably connected to each other by connectors, for example screws, operatively inserted into the through holes of the plate to engage the connecting portions of the sleeve positioned below the plate so to fasten the plate to the sleeve.

In order to facilitate the connection between the plate and the sleeve, each connecting portion includes through longitudinal channels configured to accommodate the connectors.

According to a possible embodiment, the through longitudinal channels comprise a thread having a predetermined length. Alternatively, the through longitudinal channels comprise a thread extending along the entire length of the through longitudinal channels.

In other words, each bearing is composed in two-part (plate and sleeve) that are reversibly joint together by connectors.

Alternatively to the two-pieces bearing, it is possible to use casted bearings, which are per se known in the art. They are light, easy and cheap to manufacture but, at the same time, they are brittle. The moulds used to obtain that kind of bearing are very expensive so the bearings are less customable. Moreover, as the plate and the sleeve are realized in one piece, the coating (for protecting them from aggressive agent) is not easy. Additionally, due to the particular shape of the bearings, they suffer from notch effect that makes the bearing less resistant to the torque and/or mechanical deformation.

Advantageously, making a bearing in two-pieces simplifies the handling and construction of the bearing while increasing the bearing's resistance to torsion and deformation stresses that may occur due to a host burst of the cylinder piston units and/or due to the weight distribution of the vehicle. Advantageously, the fact of making the bearing in two separate and reversibly engageable pieces also makes it possible to make an easy coating of the plate (useful to protect it as it faces outside the canister), to make the plate in different ductile materials and to make the plate with different patterns (e.g. different distributions of through-holes) adaptable to different sleeves.

In other words, the manufacturing of the bearing in two connectable pieces is preferred as it facilitates the production of the bearing itself.

Moreover, also the storage is simplified as the encumbrances are reduced. According to a preferred embodiment, the sleeve is provided as one piece through an extrusion along the longitudinal axis. In this situation, it is possible to directly extrude the sleeve's profile comprising the connecting portions.

As a further alternative to the two-pieces bearing, it is possible to use milled welding assembled bearings, which are per se known in the art. Although this type of bearing has some advantages as, for example, they allow the use of stainless-steel material and they can be produced according to costumers' requirements, the milling is not easy especially when the plate has big size and it is particularly costly. Moreover, coating the milled welding assembled bearings is not easy due to the size and the geometry of the bearing itself.

Advantageously, by extrusion instead, a sleeve can be made in any shape without the need to create special moulds. This leads to a considerable reduction in cost and time for manufacturing the bearing.

In fact, extrusion makes it possible to produce a profile suitable for a cooperation with a plurality of components, i.e. reinforcing components, in a simple and functional manner, as it will be described below.

In use, to assemble each bearing of the underfloor lifting platform, object of this description, the sleeve is positioned below the plate in such a way that each connecting portion is vertically aligned to the corresponding through hole. Then the connectors are inserted into the through hole and into the corresponding through longitudinal channels of the sleeve to fasten the plate and the sleeve.

Subsequently, each bearing is installed into the underfloor lifting platform in such a way that the cylinder liner of the first and the second cylinder piston units can slide therethrough in order to move a vehicle up and down along the vertical direction.

When the vehicle is placed on the load supports, it is possible that an unfortunate positioning of the vehicle may result in a bad weight distribution on the underfloor lifting platform that causes large torques on the bearings, and especially on the plate.

In order to considerably reduce the occurrence of the torques, the underfloor lifting platform, according to a possible embodiment, also comprises a coupling member operatively integral with the canister and distanced from the plate along the longitudinal axis.

The coupling member develops transversally to the longitudinal axis and it is vertically distanced from the plate along the longitudinal axis itself. According to a possible embodiment, the coupling member is directly connected to the plate by connectors, for example bars or screws. According to another embodiment, the coupling member could be integral with or connected to a clamping bar, as will be described below.

The coupling member includes an outer profile counter-shaped to at least a part of the outer surface of the sleeve.

The coupling member operatively abuts to the sleeve at the outer profile. More in detail, the coupling member has at least a receiving portion counter-shaped to at least part of the connecting portions.

Referring to the attached figures, the outer profile of the connecting member abuts to the lateral wall of the sleeve while two receiving portions of the coupling member abut against the smooth/rounded junction of the connecting portions so that the coupling member embraces the part of the lateral wall of the sleeve between two consecutive connecting portions.

In the shown embodiment, the coupling member and the sleeve are coupled by a dovetail geometrical coupling. The dovetail geometry is advantageously easily obtainable by the extrusion process.

Advantageously, the geometrical conformation of the coupling member and the sleeve allows to better distribute the loads due to the torque acting on the bearings making the latter mechanically more resistant.

In other words, the conformation of the outer profile of the sleeve allows a coupling between the sleeve itself and the coupling member that contrasts the torque acting on the plate of the bearing making the latter mechanically more resistant.

Referring to the attached figures, the underfloor lifting platform could also comprise a pair of guide profiles arranged fixed to the canister.

The pair of guide profiles elongate parallel to a horizontal axis belonging to a reference plane defined by the plate of the bearings and perpendicular to the longitudinal axis.

The pair of guide profiles are reciprocally spaced along a transversal direction that is parallel to the reference plane and perpendicular to the horizontal axis.

The pair of guide profiles also provide a pair of upper surfaces facing upwards in the longitudinal axis. In this situation, each bearing is located between the guide profiles in such a way that the corresponding plate lays on the upper surfaces so that the bearing can slide along the horizontal axis. In other words, each bearing is mounted on the pair of guide profiles so that the plate lays on the upper surfaces and slide along them until a predetermined position is reached.

While in use, if the bearings' position is to be changed, each plate of the bearing is leaned on the upper surfaces and it slides along them until the predetermined position is reached.

To secure each bearing in the predetermined position along the pair of guides, the upper surfaces could comprise a series of holes as well as the plate of each bearing. In this situation, while the plate slides, its holes overlap the holes of the upper surfaces so that it is possible to fix the plate of each bearing in the desired position.

In other words, the bearing is slidably brought in the desired position along the upper surfaces so that the holes realized on the plate are vertically aligned with corresponding holes of the upper surfaces allowing the introduction of fastening elements (such as screws).

To make the positioning of the bearings along the pair of guides even more flexible, i.e. in order to position the bearing wherever along the pair of guides, in a preferred embodiment, the guide profiles also provide a pair of lower surfaces facing downwards the longitudinal axis and located at a lower quote than the upper surfaces.

The upper and the lower surfaces confer to the pair of guides, in section, a "Ω" shape in which the protruding part of the "Ω" are facing one other.

As shown in the attached figures, to fix each bearing in the predetermined position, the underfloor lifting platform also comprises a first clamping bar and a second clamping bar elongating parallelly to the transversal direction.

The first clamping bar and the second clamping bar are vertically distanced from the plate and, for example, they are connected to it via rigid elements, for example screws, in such a way that the sleeve is interposed between the first clamping bar and the second clamping bar.

In this situation, the ends of the first clamping bar and the second clamping bar abut against the lower surfaces. The lower surfaces are in fact configured to receive the corresponding ends of the clamping bars.

In such situation, the first clamping bar and the second clamping bar cooperate with the plate, to the lower and upper surfaces respectively, so to reversibly fasten the bearing to the guide profiles.

More in detail, the first clamping bar and the second clamping bar cooperate with the plate in order to define a clamping system or a gripper able to clamp the pair of guide profiles (i.e. the protruding part of the "Ω") in order to maintain the bearing in the predetermined position.

To provide flexibility in modifying a previously configured installation, if the position of the bearings along the pair of guide profiles has to be changed, per each bearing, the first and second clamping bars are moved along the longitudinal axis so that the first and second clamping bars are moved away from the lower surfaces. In this situation, the ends of the first and second clamping bars are distanced from the lower surfaces and the clamping system is in a released configuration. In this situation, the bearing can be moved along the horizontal direction by sliding the plate along the upper surfaces.

Once the bearing reaches the desired position, the first and second clamping bars are brought closer to the lower surfaces until their ends abut against the lower surfaces themselves. In this way, the first and second clamping bars and the plate cooperate to clamp and tighten the pair of guide profiles maintaining the bearing in the actual position.

According to an embodiment in which the clamping bars are present, the coupling member could be provided at or integral to one of the clamping bars.

In order to facilitate the installation of the bearing on the underfloor lifting platform, the underfloor lifting platform comprises a self-carrying system including a first bracket connected to a surface of the plate facing the sleeve and to the sleeve.

The self-carrying system also includes a second bracket connected to the surface of the plate facing the sleeve and to the sleeve in such a way that the sleeve is interposed between the first and the second bracket.

The first and the second bracket have a tapered shape towards the bottom of the canister in such a way that, if the first and the second clamping bars are present, they do not interfere with them while they are fastened to the pair of guide profiles. More in detail, in order to not interfere with the first and the second clamping bars and/or with the coupling member, the first and the second bracket are angularly offset around the longitudinal axis with respect to them.

The self-carrying system also includes a base element interposed between the bottom of the canister and the piston edge. For example, the base element has an elliptical/oval shape.

Advantageously, the base element allows to reinforce the cylinder's point of action on the canister in order to allow a use also of a canister with a less reinforced bottom.

The self-carrying system also includes a first connector elongating from the first bracket to the base element and a second connector elongating from the second bracket to the base element.

For example, the first and the second connectors can be realized as bars with a circular section.

The cooperation between the brackets and the first connector and second connector allows to avoid a sliding of the bearing along the vertical direction when it is mounted on the cylinder piston unit.

The brackets and the first connector and second connector in fact define a supporting structure, a sort of skeleton, able to maintain the bearing at a predetermined heigh along the vertical direction in such a way that the cylinder piston unit could stand alone.

It is also an object of the present disclosure a method for mounting a bearing in an underfloor lifting platform for lifting vehicles. The method comprises the step of providing a canister configured to be arranged underground to define an in-ground environment and a step of providing a first and a second cylinder piston units operatively arranged within the canister in an upside configuration with the piston edge abutting the bottom of the canister. In this situation, the piston edge abuts the bottom of the canister while the cylinder liner moves in extraction and retraction from the canister.

Preferably, the method also comprises a step of mounting, per each cylinder piston unit, a load support, for example a rail, configured to support a vehicle.

The cylinder liners of the first and the second cylinder piston units are movable along a vertical direction in order to move the vehicle up and down. The method also comprises a step of providing, per each cylinder piston units, a plate including a central aperture for receiving the cylinder liner in sliding contact therethrough.

The plate also comprises through holes surrounding the central aperture. The plate could be realized in aluminium by a milling and an extrusion process.

The method also comprises a step of providing, per each cylinder piston units, a sleeve elongated along a longitudinal axis and including a lateral wall surrounding the longitudinal axis to define a passage for receiving the cylinder liner in sliding contact therethrough.

The sleeve also comprises connecting portions integral to the lateral wall and surrounding the passage.

As for example shown in the attached figures, the connecting portions are angularly distributed around the passage and they are joint to the lateral wall by a smooth/rounded junction.

Each connecting portion, for example, comprises a through longitudinal channel that houses a corresponding connector configured to fasten the plate to the sleeve.

The method in fact comprises a step of positioning each sleeve below the respective plate so that the connecting portions are arranged below the through holes of the plate. Then the method comprises a step of fastening the plate to the connecting portions of the sleeve by means of connectors operatively inserted into the through holes of the plate.

According to a preferred embodiment, the sleeve is manufactured as one piece by extrusion.

Thanks to the extrusion process, it is possible to shape the sleeve in a desired manner in order to let it cooperate with different components, such as reinforcement components, as it will be described below.

For example, in the shown embodiment, the sleeve is shaped in such a way that the lateral wall is integral with each connecting portion by the smooth/rounded junction in such a way that two consecutive connecting portions and the part of the lateral wall therebetween define a dovetail guide.

Once the two-piece bearing is assembled, the method comprises the step of mounting each bearing on the corresponding cylinder piston units and the step of fixing each plate to the canister at the floor level.

In order to facilitate the assembly of the bearing on the cylinder piston unit, per each bearing, a self-carrying system is provided.

The self-carrying system includes a first bracket connected to a surface of the plate facing the sleeve and to the sleeve.

The self-carrying system includes a second bracket connected to the surface of the plate facing the sleeve and to the sleeve in such a way that the sleeve is interposed between the first and the second bracket.

For example, according to the shown embodiment, the first and the second bracket comprises a rectangular portion adhering to the surface of the plate facing the sleeve and a tapered downwards portion connected to the lateral wall or the connecting portions of the sleeve.

The self-carrying system also includes a base element interposed between the bottom of the canister and the piston edge.

The self-carrying system also includes a first connector elongating from the first bracket to the base element and a second connector elongating from the second bracket to the base element.

The first and the second connectors could be realized as rigid bars in order to support the first and the second bracket defining a sort of skeleton configured to avoid an accidental slide of the bearing along the vertical direction.

Since, when a vehicle is positioned on the load support, it is possible that the weight distribution is not optimal, this leads to a generation of torques and deformation acting on the bearings.

In order to reduce the mechanical stresses that the bearings have to stand, according to an aspect of the present description, the method could also comprise a step of providing a coupling member integral to the canister and including an outer profile counter-shaped to at least a part of the outer surface of the sleeve.

The method also comprises a step of joining the coupling member to the plate in a vertically distanced position along the longitudinal axis and a step of arranging the coupling member in contact with an outer portion of the sleeve to reduce, when in use, a torque acting on the plate.

The coupling member could have at least a receiving portion counter-shaped to at least part of the connecting portions.

When joint to the sleeve, the coupling member has the outer profile that abuts to the lateral wall of the sleeve while two receiving portions abut against the smooth/rounded junction of the connecting portions so that the coupling member embraces the part of the lateral wall of the sleeve between two consecutive connecting portions.

In the shown embodiment, the coupling member and the sleeve are coupled by a dovetail geometrical coupling.

During the arranging steps, the coupling member is positioned in contact with the sleeve in such a way that is angularly offset around the longitudinal axis with respect to the first and the second bracket so as to avoid a reciprocal interference between the coupling member and the first and second bracket.

The method could also comprise a step of providing a pair of guide profiles integral to the canister and both elongating along a horizontal axis laying on a reference plane orthogonal to the longitudinal axis.

The pair of guide profiles are reciprocally spaced along a transversal direction parallel to the reference plane and perpendicular to the horizontal axis.

The guide profiles define a pair of upper surfaces and a pair of lower surfaces. The upper surfaces face upwards in the longitudinal axis while the lower surfaces face downwards in the longitudinal axis.

The method also comprises a step of positioning the plate on the upper surfaces so that the bearing can slide along the horizontal axis and a step of providing a first and a second clamping bars.

The first and a second clamping bars elongate between the guide profiles parallel to the transversal direction and cooperating with the plate to define a clamp acting on the guide profiles.

Through the clamp, the bearing is secured to the pair of guide profile in a first position.

More in detail, the clamping bars in cooperation with the plate define a clamping system configured to clamp the guide profiles in order to let the bearing maintain first position along the guide profiles.

Then, if the position of the bearings along the guide profiles has to be changed, the method comprises a step of releasing the clamp so that the bearing can slide on the upper surfaces of the guide profiles and adjusting the position of the bearing along from the first position to a second position.

The first and second clamping bars are moved along the longitudinal axis so that the first and second clamping bars are brought away from the lower surfaces. In this situation, the ends of the first and second clamping bars are distanced from the lower surfaces and the clamping system is in a released configuration. In this situation, the bearing can be moved along the horizontal direction by sliding the plate along the upper surfaces.

Once the bearing reaches a second desired position, the method comprises a step of securing, through the clamp, the bearing to the pair of guide profile in the second position. The first and second clamping bars are brought closer to the lower surfaces until their ends abut against the lower surfaces themselves. In this way, the first and second clamping bars and the plate cooperate to clamp and tighten the guide profiles maintaining the bearing in the actual position.

According to a preferred embodiment, when the clamp is applied to the bearing, a coupling member is provided at one of the clamp bars. The coupling member abuts to an outer surface of the sleeve at a longitudinal distance from the corresponding plate. Also in this case, the coupling member is configured to reinforce the sleeve in order to better withstand the applied torque.

Advantageously, the method results in particularly strong bearings.

Advantageously, the method allows bearings to be mounted conveniently and easily.

Advantageously, the method allows a convenient storage and an easier transport.

Further features and advantages of the present disclosure will become clearer from the indicative, and therefore non-limiting, description of a form of embodiment of an underfloor lifting platform.

BRIEF DESCRIPTION OF THE DRAWINGS

This description will be set out below with reference to the accompanying drawings, which are provided for indicative and therefore non-limiting purposes only, in which.

DESCRIPTION OF EXAMPLE EMBODIMENTS

Figure 1:
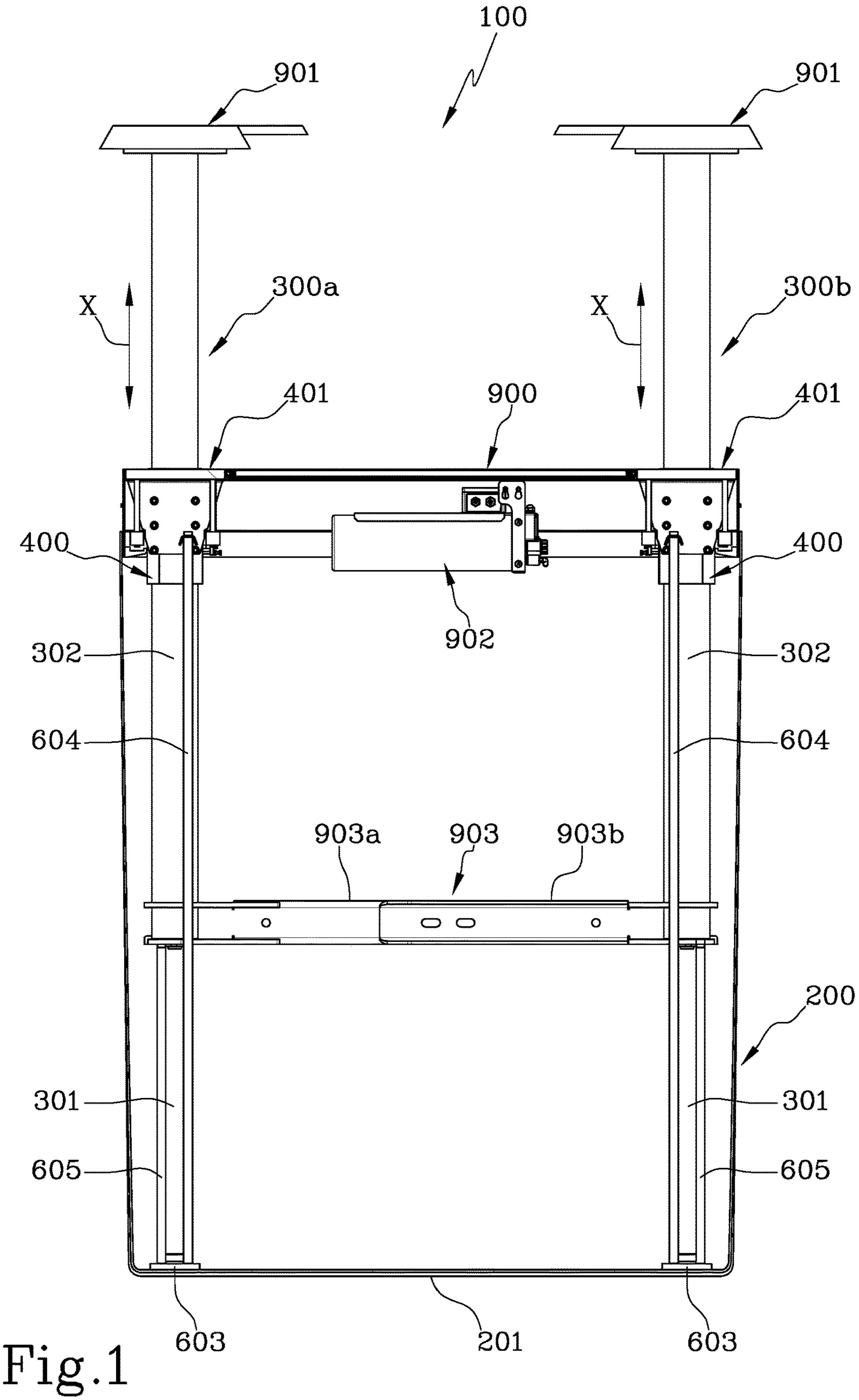
FIG. 1 is a front view of an underfloor lifting platform for lifting vehicles according to this disclosure.

With reference to the attached figures, an underfloor lifting platform for lifting vehicles has been indicated with the reference 100.

The underfloor lifting platform 100 comprises a canister 200 configured to be arranged underground to define an in-ground environment.

The canister 200 is closed at the top with one central plate 900 and two other plates 401 that, as the central plate 900, are flush with the floor.

The underfloor lifting platform 100 also comprises a first and a second cylinder piston units 300*a*, 300*b* operatively arranged within the canister 200 in an upside configuration with the piston edge 301 abutting the bottom 201 of the canister 200.

More in detail, the piston edge 301 of each cylinder piston units 300*a*, 300*b* abut the bottom 201 of the canister 200 while the cylinder liner 302 of each cylinder piston units 300*a*, 300*b* moves along a vertical direction "X" to protrude from or retract into the canister 200.

As shown in the attached figures, load supports 901, for example rails, are arranged at the upper ends of the cylinder liner 302 of each cylinder piston units 300*a*, 300*b* in order to accommodate a vehicle to move it up and down along the vertical direction "X".

Inside the in-ground environment defined by the canister 200, there is a handling unit 902, for example a hydraulic unit, positioned below the central plate 900 and configured to move the first and a second cylinder piston units 300*a*, 300*b*.

More in detail, when the handling unit 902 is activated, it pushes the cylinder liner 302 of the first and a second cylinder piston units 300*a*, 300*b* upwards in such a way to protruding from the canister 200. As a result, the load supports 901 together with the vehicle are lifted off the floor and moved upwards.

In order to ensure synchronization of the first and the second cylinder piston units 300*a*, 300*b*, i.e. that the two cylinder piston units 300*a*, 300*b* always extend at the same height, a synchronization device 903 is provided among them.

Figure 2:
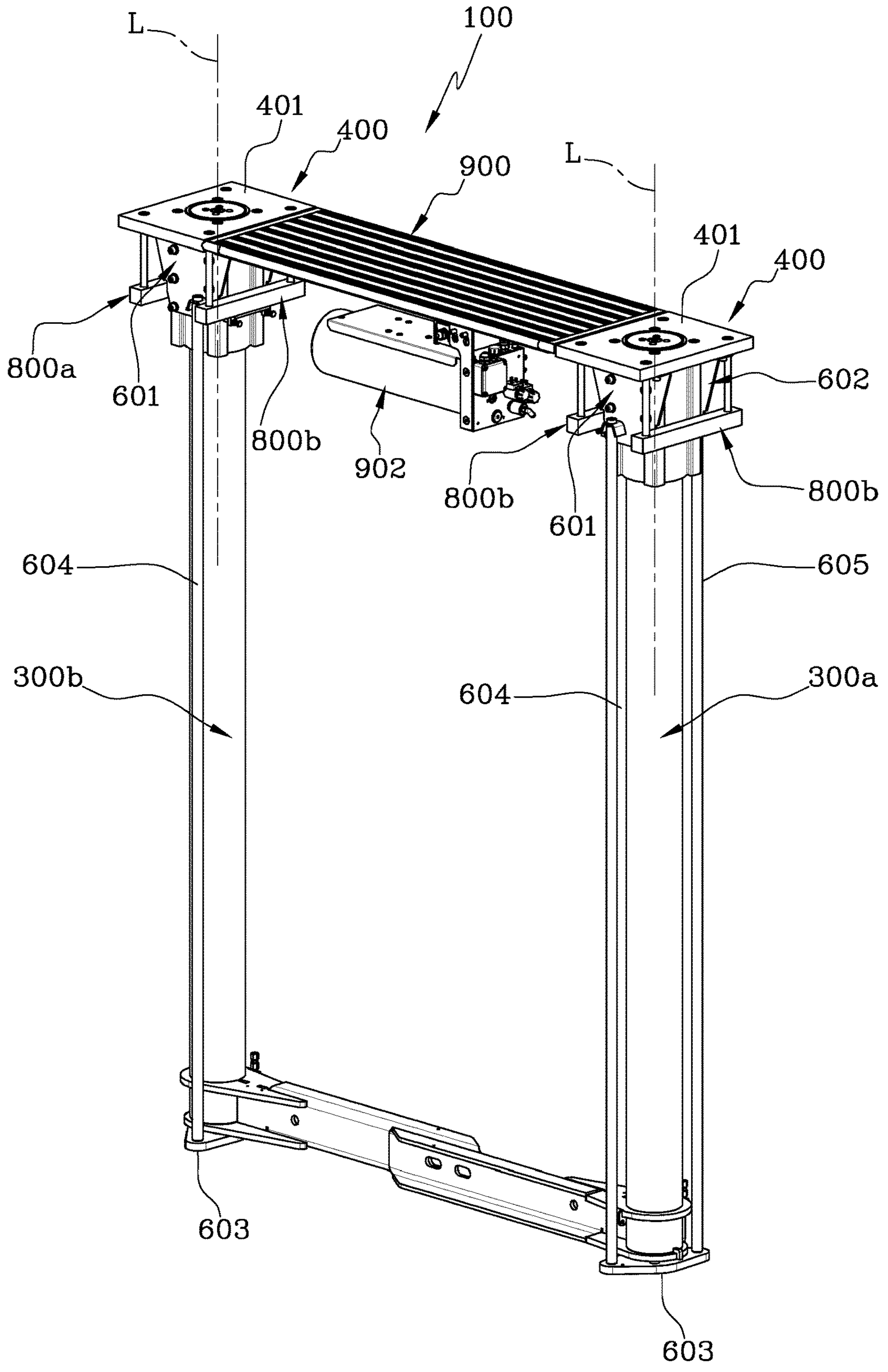
FIG. 2 is perspective view of the underfloor lifting platform where the canister has been removed.

For example, as shown in FIG. 2, the synchronization device 903 comprises two levers 903*a*, 903*b* that define a rigid crossbar.

Each leveler is connected to one between the first and the second cylinder piston unit 300*a*, 300*b* via fastening elements in the form of a collar part that is preferably annular and encloses the lower end of the cylinder liner 302.

As shown in FIG. 2, the levelers 903*a*, 903*b* are connected to each other in an overlapping manner in the central area of the rigid crossbar. The levelers 903*a*, 903*b* are connected to each other for example by a screw connection, which allows a slight play and thus a slight articulation between the two levers 903*a*, 903*b*.

Figure 8:
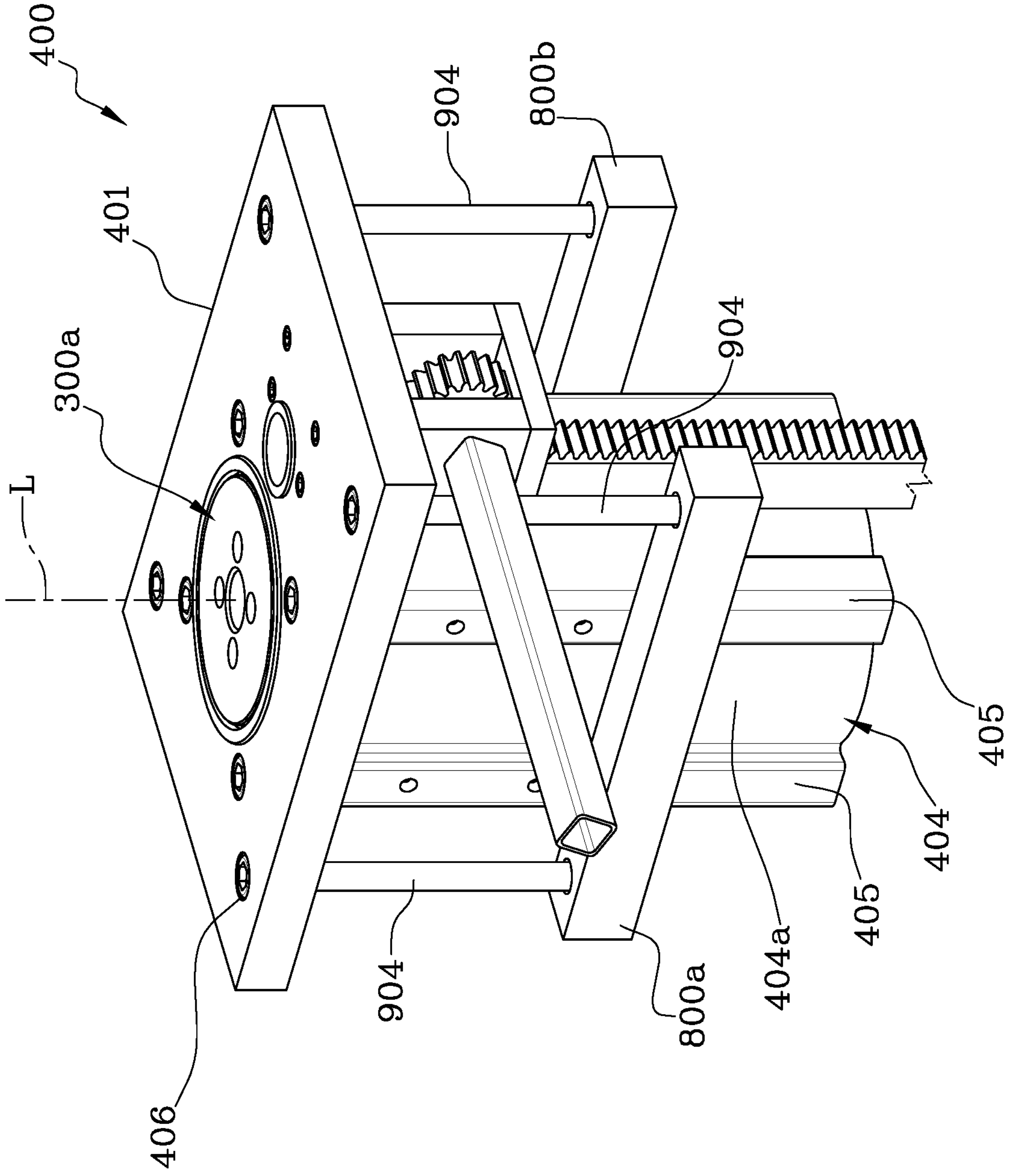
FIG. 8 shows perspective views of another embodiment of a bearing of an underfloor lifting platform according to this disclosure.

The synchronization device 903 defined by the levelers 903*a*, 903*b* prevents that, in case of leakage of one cylinder piston units 300*a*, 300*b*, the cylinder piston unit 300*a*, 300*b* can sink down unhindered as it is stopped by the connection with the other cylinder piston unit 300*a*, 300*b*. The synchronization device 903 thus also serves as a catching device. Alternatively, to the above-mentioned embodiment, the synchronization device could also be realized as shown in FIG. 8. In that embodiment, the synchronization device comprises a straight toothed guide parallel to the longitudinal axis and a cogwheel positioned below the plate and geared to the straight toothed guide.

The underfloor lifting platform 100 also comprises a first and a second bearing 400 operatively associated to an upper region of the canister 200. As shown in FIG. 1 or 2, the bearings 400 are placed at the sides of the central plate 900 at the floor level in such a way to define, with the central plate 900, a flush surface to the floor.

The bearings 400 are configured to slidably guide the cylinder liner 302 of the first and the second cylinder piston units 300*a*, 300*b*, respectively, in their movement along the vertical direction "X".

In other words, when the handling unit 902 is activated, it pushes the cylinder liners 302 upwards through the bearings 400 so that the cylinder liners 302 protrude from the canister 200 pushing the load supports 901 upwards along the vertical direction "X".

Figure 3:
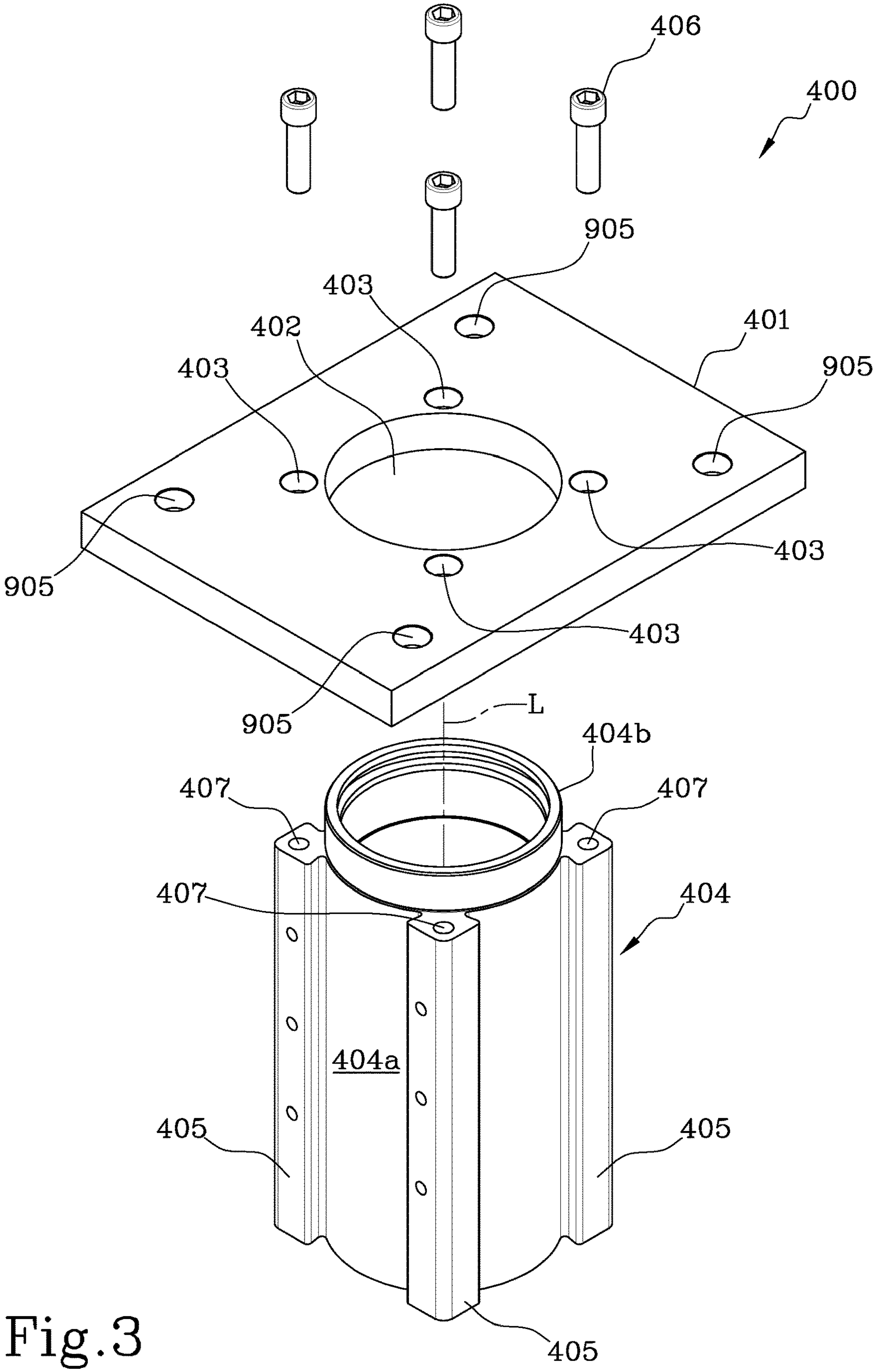
FIG. 3 is an exploded view of a bearing of the underfloor lifting platform according to this disclosure.

As shown for example in FIG. 3, each bearing 400 comprises a plate 401. The plate 401 is flush with the central plate 900 and it is operatively connected to the canister 200 in order to not change its position along the vertical direction "X".

The plate 401 includes a central aperture 402 for receiving the cylinder liners 302 in contact therethrough and through holes 403 surrounding the central aperture 402.

According to a possible embodiment, the plate 401 is a milled aluminium plate that allows an easy coating, especially dipping coating.

Each bearing 400 also includes a sleeve 404 elongated along a longitudinal axis "L" and including a lateral wall 404*a* surrounding the longitudinal axis "L" to define a passage for receiving the cylinder liner 302 in sliding contact therethrough.

The sleeve 404 is fitted on the cylinder liner in such a way to allow the cylinder liner 302 to slide therethrough along the vertical direction "X". The sleeve 404 also comprises connecting portions 405 integral to the lateral wall 404*a* and surrounding the passage.

Figure 4B:
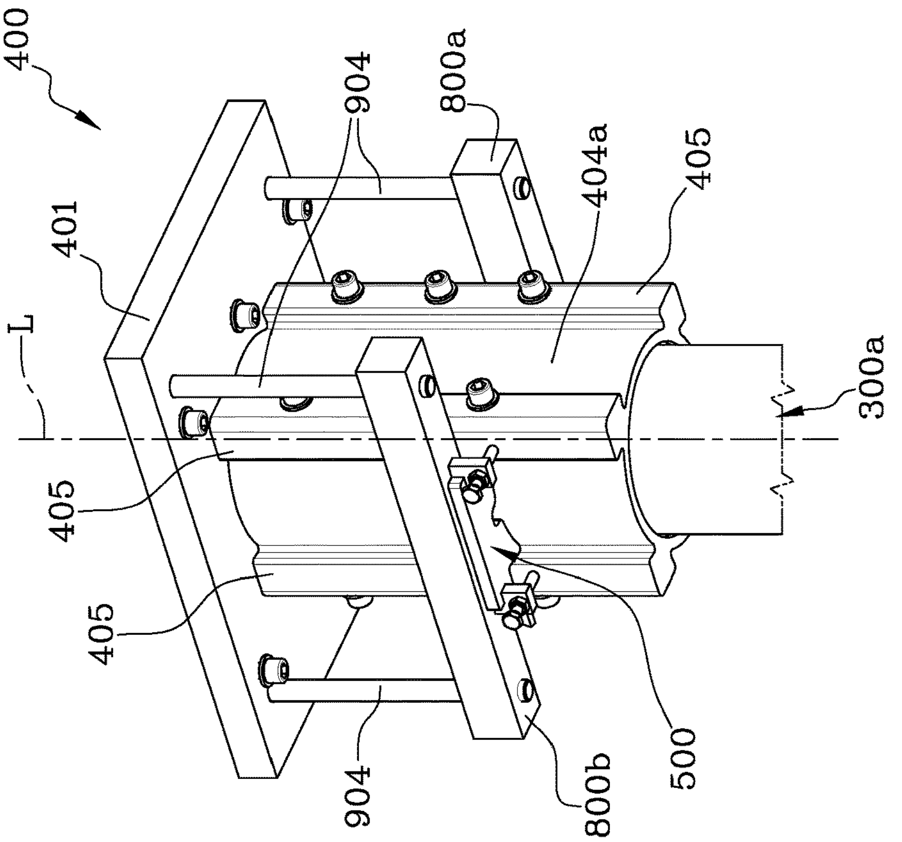
FIGS. 4A and 4B respectively show perspective views of the bearing coupled with a cylinder.
Figure 4A:
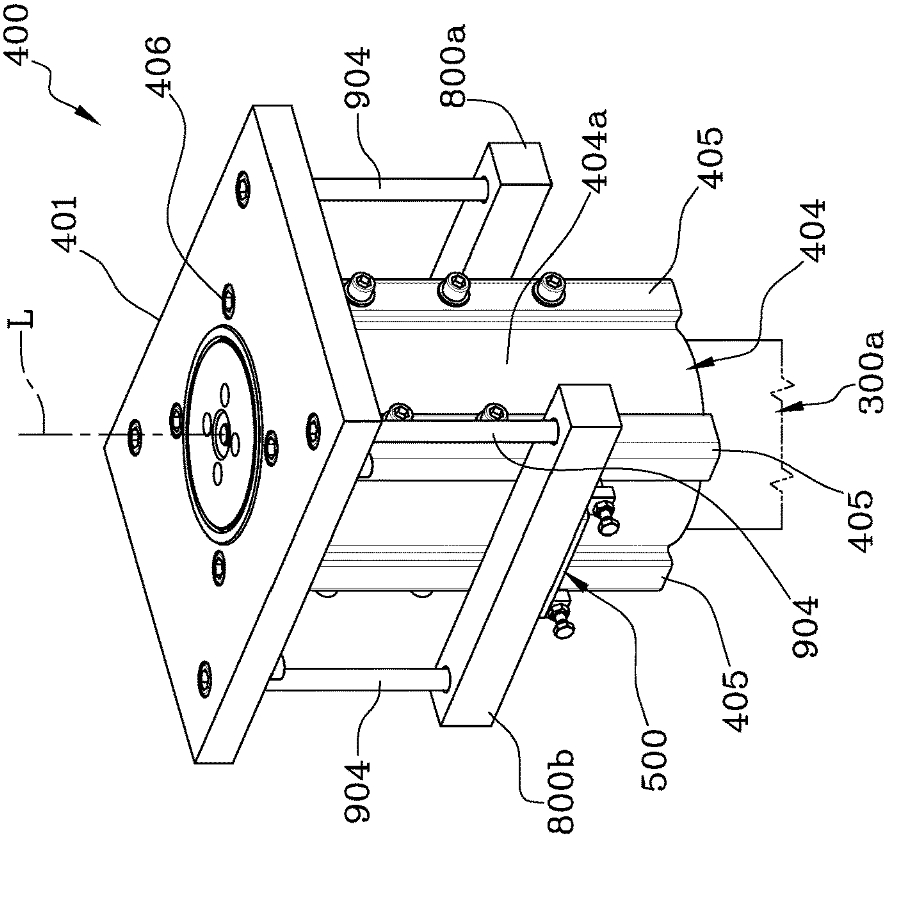
Figure 5:
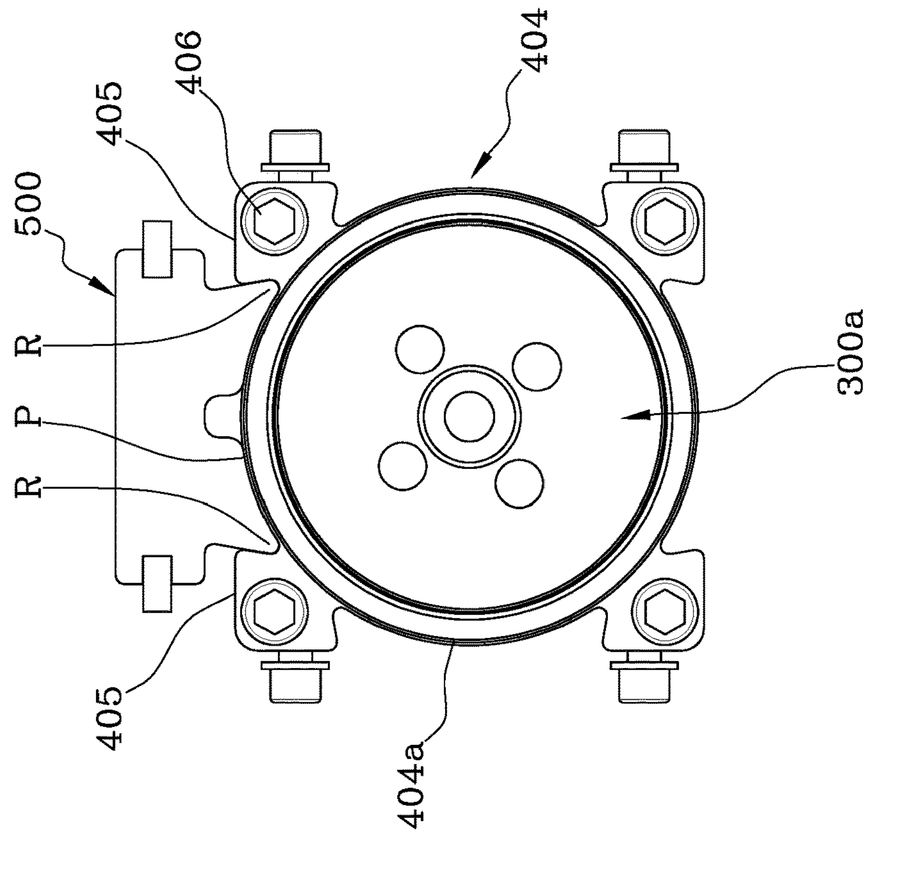
FIG. 5 is a sectional view of the bearing of FIGS. 4A and 4B.

As, for example shown in FIGS. 4A, 4B and 5, the connecting portions 405 define ribs radially protruding from an outer surface of the lateral wall 404*a* of the sleeve 404.

As an example, the connecting portions 405 define four ribs (FIG. 5) angularly distributed around the passage defined by the lateral wall 404*a* so as to define vertices of a square.

As shown in FIG. 5, the ribs can, for example, protrude from the lateral wall 404*a* in such a way to be connected to the lateral wall 404*a* by a smooth/rounded junction.

In accordance with an example of the present disclosure, the sleeve 404 is provided as one piece through an extrusion along the longitudinal axis "L".

For example, the sleeve 404 can be a milled extruded aluminium profile. By extrusion, it is therefore possible to directly obtain a sleeve 404 with a profile in which the connecting portions 405 are integral to the lateral wall 404*a*.

Advantageously, the extruded sleeve 404 does not require mould draft. Moreover, the simple but effective shape profile of the sleeve 404 renders the sleeve 404 itself easily adaptable to any bearing-reinforcement elements or other devices, as it will be explained.

Moreover, by extrusion, the sleeve 404 does not require subsequent machining exception made only for those inner point where gaskets and guiding rings must be installed.

Advantageously, the extruded sleeve 404 is ductile and it does not need special coating. This contributes to lower the costs of production.

As shown in FIG. 3, the sleeve 404 has an upper hollow tubular portion 404*b* operatively inserted into the central aperture 402 of the plate 401. The upper hollow tubular portion 404*b* has an axial extension slightly higher than a thickness of the plate 401 so that the upper hollow tubular portion 404*b* has a circular rim arranged substantially flush with an upper surface of the plate 401.

Each bearing 400 also comprises connectors 406, for example screws, operatively inserted into the through holes 403 of the plate 401 to engage the connecting portions 405 of the sleeve 404 positioned below the plate 401 so to fasten the plate 401 to the sleeve 404.

More in particular, the connecting portions 405 include milled threads 407 configured to accommodate the connectors 406.

Each bearing 400 is therefore formed by two distinct pieces, i.e the plate 401 and the sleeve 404, reciprocally and removably connected by the connectors 406.

As shown in FIG. 3, the sleeve 404 is positioned below the plate 401 in such a way that the central aperture 402 for receiving the cylinder is vertically aligned with the passage defined by the sleeve 404 so to allow the sliding movement of the cylinder liner 302 therethrough. In this situation, each through holes 403 of the plate 401 are vertically aligned with a respective connecting portion 405 in order to let a connector 406 pass therethrough to fasten the plate 401 and the sleeve 404.

Then, the upper tubular hollow portion 404*b* is inserted into the central aperture 402 and the connectors 406 are fastened into the through holes 403 and into the milled threads 407.

When inserted into the through holes 403, the connectors 406 heads are flush with the plate 401.

Subsequently, the sleeve 404 is fitted on the cylinder piston units 300*a*, 300*b* and the plate 402 is connected to the canister 200 to be flush with the central plate 900.

Advantageously, the two-part configuration of the bearing 400 renders the bearing 400 itself more reliable and able to stand high torques caused by the load ratio between the front and the rear part of the vehicle positioned on the loads support 901 and/or by the big distance between the first and the second cylinder piston units 300*a*, 300*b*.

In a preferred example of the disclosure, to further reinforce the resistance of each bearing 400 to the torque, the underfloor lifting platform 100 comprises, for each bearing 400, a coupling member 500 operatively integral with the canister 200 and distanced from the plate 401 along the longitudinal axis "L".

As shown in FIGS. 4A and 4B, the coupling member 500 is perpendicular to the longitudinal axis "L" and it is vertically distanced from the plate 401 along the longitudinal axis "L" in order to be positioned below the plate 401 itself. The coupling member 500 operatively abuts to the sleeve 404 at an outer profile "P".

As shown in FIG. 5, the coupling member 500 in fact includes an outer profile "P" counter-shaped to at least a part of the outer surface of the sleeve 404.

For example, referring to FIG. 5, the outer profile "P" is counter-shaped to a portion of the lateral wall 404*a* of the sleeve 404 comprised between two consecutive connecting portions 405.

The coupling member 500 has also at least a receiving portion "R" counter-shaped to at least part of the connecting portions 405.

Preferably, the coupling member 500 has two receiving portions "R" counter-shaped to respective smooth/rounded junction that connect the connecting portions 405 to the lateral wall 404*a*.

As shown in FIG. 5, the coupling member 500 and the sleeve 404 are coupled by a dovetail geometrical coupling.

In this situation, the two receiving portions "R" are inserted among a respective connecting portion 405 and the lateral wall 404*a* of the sleeve 404 to abut against the smooth/rounded junction while the outer-profile "P" abut against portion of the lateral wall 404*a* between the above-mentioned connecting portions 405.

The presence of the coupling member 500 and its geometrical conformation allow to distribute the forces between the coupling member 500 itself and the plate 401 of each bearing 400 giving greater mechanical strength to the bearings 400 themselves.

Unlike the known underfloor lifting platform where the plate 401 of the bearing 400 derives all the torque and the generated flexible deformations, the geometrical configuration of the bearings 400 and the coupling member 500 of the present disclosure allow to equally distribute the force and improve the global resistance of the underfloor lifting platform 100, as will be further described.

Figure 7:
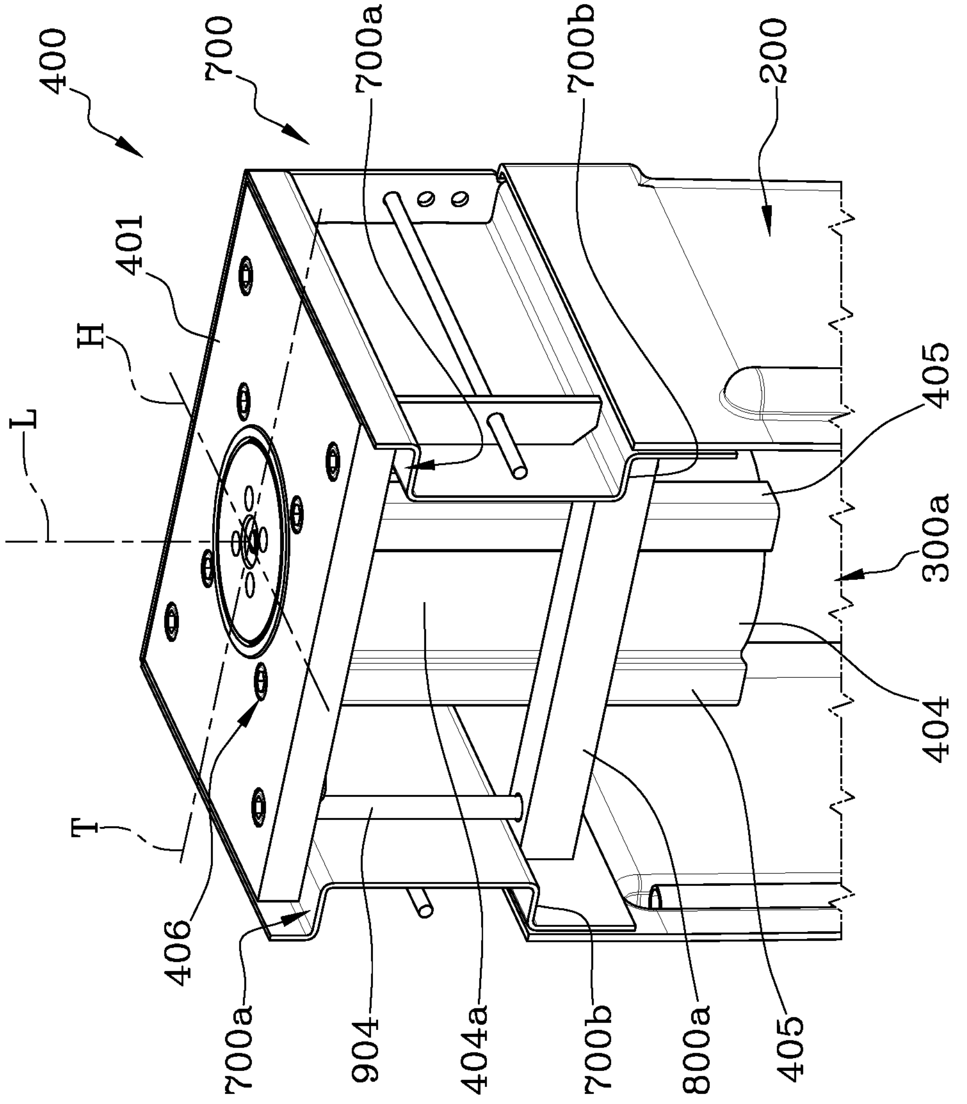
FIG. 7 is a perspective view of a bearing according to this disclosure mounted on a pair of guide profiles arranged fixed to the canister.

Referring to the embodiment of FIG. 7, the underfloor lifting platform 100, comprises a pair of guide profiles 700 arranged fixed to the canister 200. More in detail, the guide profiles 700 could be integral to an upper edge of the canister 200 or they could be reversibly connected to the canister 200. The guide profiles 700 elongate parallel to a horizontal axis "H" belonging to a reference plane defined by the plate 401 and perpendicular to the longitudinal axis "L".

The guide profiles 700 are reciprocally spaced along a transversal direction "T" parallel to the reference plane and perpendicular to the horizontal axis "H".

The guide profiles 700 provide a pair of upper surfaces 700*a* facing upwards in the longitudinal axis "L".

In this situation, each bearing 400 is located between the guide profiles 700 in such a way that the corresponding plate 401 lays on the upper surfaces 700*a* so that the bearing 400 can slide along the horizontal axis "H".

In other words, the guide profiles 700 are shaped to define a pair of upper surfaces 700*a* facing each other and reciprocally spaced to allow support of the plates 401 of the bearings 400 that can slide along the pair of upper surfaces 700*a* moving away or approaching each other.

Advantageously, the fact that the bearings 400 rest on the upper surfaces 700*a* and slide along them makes it easier and practical to vary the reciprocal position of the bearings 400 along the horizontal axis "H".

The guide profiles 700 could also provide a pair of lower surfaces 700*b* facing downwards in the longitudinal axis "L" and located at a lower quote than the upper surfaces 700*a*.

As shown in FIG. 7, the upper and the lower surfaces 700*a*, 700*b* give each guide profile 700, in section, a "Ω" shape where the protruding part of the "Ω" shape are facing each other.

Figure 6:
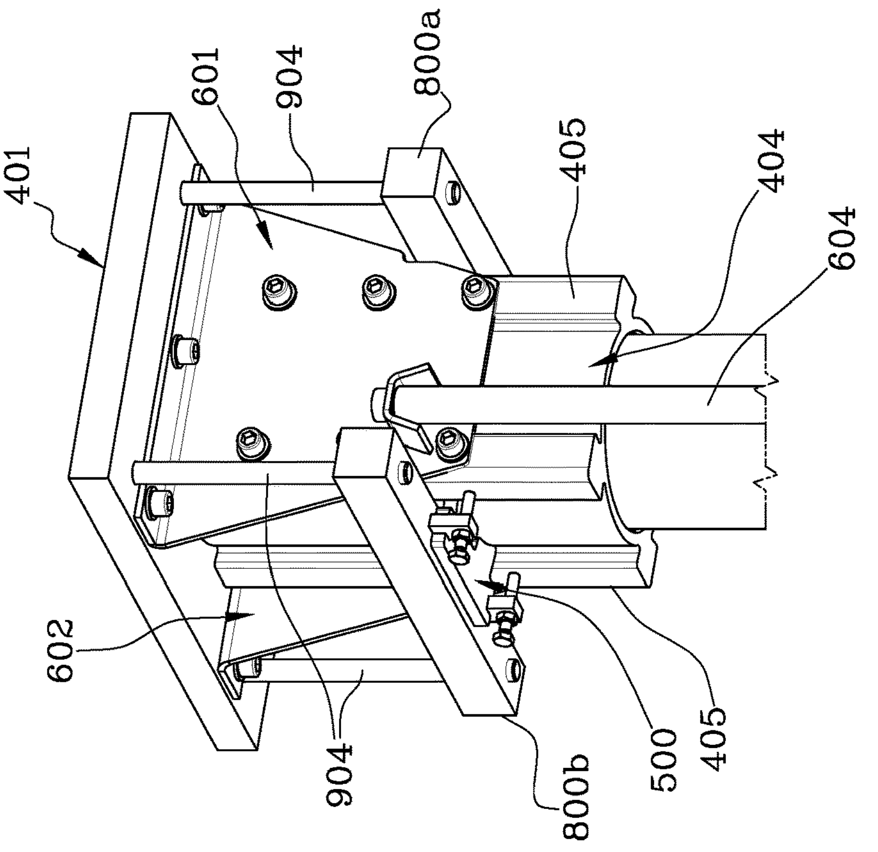
FIG. 6 is a perspective view of a bearing according to this disclosure on which a self-carrying system is applied.

Referring, for example, to the embodiment shown in FIGS. 6 and 7, for each bearing 400, the underfloor lifting platform 100 could also comprise a first clamping bar 800*a* and a second clamping bar 800*b* elongating parallelly to the transversal direction "T".

The first clamping bar 800*a* and a second clamping bar 800*b* are operatively connected to the plate 401 of the bearing 400 in such a way that the sleeve 404 is interposed between the first clamping bar 800*a* and a second clamping bar 800*b*.

In a preferred embodiment, the first clamping bar 800*a* and a second clamping bar 800*b* are connected to the plate 401 by means of a respective pair of rigid connectors 904 parallel to the longitudinal axis "L" and screwed into seats 905 obtained on the plate 401.

The rigid connectors 904 allow to position the first clamping bar 800*a* and a second clamping bar 800*b* below the plate 401 at a predetermined distance from it along the longitudinal axis "L".

As shown in FIG. 7, the first clamping bar 800*a* and a second clamping bar 800*b* are located below the lower surfaces 700*b* in order to abut against them.

The lower surfaces 700*b* are in fact configured to receive corresponding ends of the clamping bars 800*a*, 800*b* that cooperate with the plate 401, to lower and upper surfaces 700*a*, 700*b* respectively so to reversibly fasten the bearing 400 to the guide profiles 700.

More in detail, the clamping bars 800*a*, 800*b* in cooperation with the plate 401 define a clamping system configured to clamp the guide profiles 700 in order to let the bearing 400 maintain a predetermined position along the guide profiles 700.

If the position of the bearings 400 along the guide profiles 700 has to be changed, the rigid connectors 904 are activated in order to move the first and second clamping bars 800*a*, 800*b* along the longitudinal axis "L", for example by the same amount, so that the first and second clamping bars 800*a*, 800*b* are moved away from the lower surfaces 700*b*. In this situation, the ends of the first and second clamping bars 800*a*, 800*b* are distanced from the lower surfaces 700*b* and the clamping system is in a released configuration. In this situation, the bearing 400 can be moved along the horizontal direction "H" by sliding the plate 401 along the upper surfaces 700*a*.

Once the bearing 400 reaches the desired position, the rigid connectors 904 are activated again in order to bring the first and second clamping bars 800*a*, 800*b* closer to the lower surfaces 700*b* until their ends abut against the lower surfaces 700*b* themselves. In this way, the first and second clamping bars 800*a*, 800*b* and the plate 401 cooperate to clamp and tighten the guide profiles 700 maintaining the bearing 400 in the actual position.

In other words, the first and second clamping bars 800*a*, 800*b* and the plate 401 defines a sort of a gripper that can be tightened or released in order to, respectively, fix or released the each bearing 400 on the pair of guide profile 700.

According to the embodiment shown in the attached figures, the coupling member 500 is provided at or integral to one of the clamping bars 800*a*, 800*b*.

In the embodiment shown, the coupling member 500 is, for example, connected to the second clamping bar 800*b*. In particular, the coupling member 500 is engaged inferiorly to it so that the second clamping bar 800*b* is interposed between the coupling member 500 and the plate 401 and it is distanced from the plate 401 itself.

As shown in FIG. 6, the coupling member 500 is also connected to the sleeve 404 by means of pins or screws configured to fit into their respective housings/holes realized in the connecting portions 405. In this situation, the clamping system is connected to the bearing 400 also due to the cooperation of the coupling member 500 with the sleeve 404 via the dovetail geometrical coupling that ensures, when the bearing 400 undergoes a torque, that the clamping system derive a part of the force avoiding, especially in case of hose burst, a critical deflection of the plate 401. The underfloor lifting platform 100 could also comprise a self-carrying system configured to allow easy and convenient mounting of the bearings 400.

The self-carrying system includes a first bracket 601 connected to a surface of the plate 401 facing the sleeve 404 and to the sleeve 404 and a second bracket 602 connected the surface of the plate 401 facing the sleeve 404 and to the sleeve 404 in such a way that the sleeve 404 is interposed between the first and the second bracket 601, 602 (FIG. 6).

Preferably, the first and the second bracket 601, 602 are connected to the sleeve 404 by means of screws that fit into housings realized on the connecting portions 405.

As shown in FIGS. 2 and 6, the coupling member 500 is angularly offset around the longitudinal axis "L" with respect to the first and the second bracket 601, 602, so as to avoid a reciprocal interference between the coupling member 500 and the first and second bracket 601, 602.

Referring to FIG. 2 or 6, also the clamping bars 800*a*, 800*b* are angularly offset around the longitudinal axis "L" with respect to the first and the second bracket 601, 602, so as to avoid a reciprocal interference.

Advantageously, in the case where the coupling element 500 is fixed to or integral with one of the first and second clamping bars 800*a*, 800*b*, the rear side and the front side of the sleeve 404 is free to accommodate the first and the second bracket 601, 602 and, eventually, any other devices. According to FIG. 6, the first and the second bracket 601, 602 could, for example, also be shaped as a trapezoid in which the larger base is connected to the plate 401. This shape allows to avoid interference between the brackets 601, 602 and the clamping bars 800*a*, 800*b* when the clamping system fixes the bearing 400 to the pair of guide profiles 700.

As shown in FIG. 2, the self-carrying system also comprises a base element 603 interposed between the bottom 201 of the canister 200 and the piston edge 301.

As an example, in FIG. 2, the base element 603 show an elliptical or oval shape.

The base element 603 is placed below the piston edge 301, thus avoiding the need to make a canister 200 with a reinforced bottom. In this situation, the production costs of the canister 200 are reduced.

In other words, the base element 603 acts as a reinforcement for the canister 200 so that at the thrust point of the cylinder pinto unit 300*a*, 300*b* it is stronger and reinforced without the entire bottom 201 of the canister 200 being reinforced.

The self-carrying system also comprises a first connector 604 elongating from the first bracket 601 to the base element 603 and a second connector 605 elongating from the second bracket 602 to the base element 603.

The first and the second connectors 604, 605 are rigid connectors and are positioned in such a way that the cylinder piston unit 300*a*, 300*b* is interposed therebetween.

In the embodiment shown in the attached figures, the first and the second connectors 604, 605 are realized in the form of a bar having a circular section.

Thanks to the cooperation between the first and the second bracket 601, 602 and the first and the second connector 604, 605, when the bearing 400 is mounted on the cylinder piston unit 300*a*, 300*b*, it is unable to slide along the vertical direction "X" down to the bottom 201 of the canister 200 and the cylinder piston unit 300*a*, 300*b* is able to stand alone.

It is also an object of the present disclosure a method for mounting a bearing 400 in an underfloor lifting platform 100 for lifting vehicles.

The method comprising a step of providing a canister 200 configured to be arranged underground to define an in-ground environment and a step of providing a first and a second cylinder piston units 300*a*, 300*b* operatively arranged within the canister 200 in an upside configuration with the piston edge 301 abutting the bottom 201 of the canister 200.

The first and the second cylinder piston units 300*a*, 300*b* are movable along a vertical direction "X". In particular, the cylinder liners 302 of the first and the second cylinder piston units 300*a*, 300*b* are configured to protrude from or retract into the canister 200. As shown in the attached figures, load supports 901, for example rails, are arranged at the upper ends of the cylinder liners 302 of each cylinder piston units 300*a*, 300*b* in order to accommodate a vehicle to move it up and down along the vertical direction "X".

The method also comprises a step of providing, per each cylinder piston units 300*a*, 300*b*, a plate 401 including a central aperture 402 for receiving the cylinder liner 302 in sliding contact therethrough and through holes 403 surrounding the central aperture 402.

The method also comprises a step of providing, per each cylinder piston units 300*a*, 300*b*, a sleeve 404 elongated along a longitudinal axis "L" and including a lateral wall 404*a* surrounding the longitudinal axis "L" to define a passage for receiving the cylinder liner 302 in sliding contact therethrough. The sleeve 404 also includes connecting portions 405 integral to the lateral wall 404*a* and surrounding the passage.

Preferably, the connecting portions 405 define ribs radially protruding from an outer surface of the lateral wall 404*a* of the sleeve 404.

According, for example, to the embodiment shown in the attached figures, the connecting portions 405 are joined to the lateral wall 404*a* of the sleeve 404 by a rounded or smooth joint.

According to an aspect of the present disclosure, the sleeve 404 is manufactured as one piece by extrusion.

In this situation, the lateral wall 404*a* of the sleeve 404 and the connecting portions 405 are integral and can be obtained through a single extrusion. The method also comprises a step of positioning each sleeve 404 below the respective plate 401 so that the connecting portions 405 are arranged below the through holes 403 of the plate 401 and a step of fastening the plate 401 to the connecting portions 405 of the sleeve 404 by means of connectors 406 operatively inserted into the through holes 403 of the plate 401.

In the shown embodiment, on the connecting portions 405, milled threads 407 are realized and configured to accommodate the connectors 406 in order to fix the plate 401 to the corresponding sleeve 404. In this situation, each connector 406 is operatively inserted into a corresponding through holes 403 of the plate 401 in such a way to be screwed into the corresponding milled threads 407 to obtain a two-part bearing 400.

Then the method comprises the step of coupling each bearing 400 on the corresponding cylinder piston units 300*a*, 300*b*.

In order to do so, the method could comprise a step of providing, for each bearing 400, a self-carrying system including a first bracket 601 connected to a surface of the plate 401 facing the sleeve 404 and to the sleeve 404 and a second bracket 602 connected to the surface of the plate 401 facing the sleeve 404 and to the sleeve 404 in such a way that the sleeve 404 is interposed between the first and the second bracket 601, 602.

The self-carrying system also includes, per each bearing 400, a base element 603 interposed between the bottom 201 of the canister 200 and the piston edge 301.

The self-carrying system also includes a first connector 604 elongating from the first bracket 601 to the base element 603 and a second connector 605 elongating from the second bracket 602 to the base element 603. The first and the second connectors 604, 605 are rigid connectors.

In this situation, the method comprises a step of connecting the first and the second bracket 601, 602 respectively with a rear side and a front side of the bearing 400. In this situation, the sleeve 404 is interposed between the first and the second bracket 601, 602 and the plate 401 is connected to it. Moreover, the method comprises a step of connecting the first and the second connectors 604, 605 to the first and the second bracket 601, 602 respectively and to the base element 603 so that the plate 401 is supported by the brackets 601, 602.

In this situation, the base element 603 is placed below the piston edge 301, thus avoiding the need to make a canister 200 with a reinforced bottom. The base element 603 acts as a reinforcement for the canister 200 so that at the thrust point of the cylinder pinto unit 300*a*, 300*b* it is stronger and reinforced without the entire bottom 201 of the canister 200 being reinforced.

According to an aspect of the present disclosure, the method comprises the step of fixing each plate 401 to the canister 200 at the floor level. In this situation, the under floor lifting platform 100 is entirely inside the canister 200 and the only elements that emerge from the canister 200 are the load support 901.

The method could also comprise a step of providing a pair of guide profiles 700 connected to the canister 200 and both elongating along a horizontal axis "H" laying on a reference plane orthogonal to the longitudinal axis "L" (FIG. 7).

The pair of guide profiles 700 are reciprocally spaced along a transversal direction "T" parallel to the reference plane and perpendicular to the horizontal axis "H".

The guide profiles 700 define a pair of upper surfaces 700*a* and a pair of lower surfaces 700*b*.

More in detail, the upper surfaces 700*a* face upwards in the longitudinal axis "L" while the lower surfaces 700*b* face downwards in the longitudinal axis "L" and they are located at a lower quote than the upper surfaces 700*a*. As shown for example in the embodiment of FIG. 7, the upper surfaces 700*a* and the lower surfaces 700*b* confer to the guide profiles 700, in section, a "Ω" shape.

In this situation, the method comprises a step of positioning the plate 401 of each bearing 400 on the upper surfaces 700*a* so that the bearing 400 can slide along the horizontal axis "H".

By doing so, the bearings 400 are free to slide along the guide profiles 700 in order to adjust their reciprocal position.

In order to fix the bearing 400 to the floor level, the method also comprises a step of providing a first and a second clamping bars 800*a*, 800*b* elongating between the guide profiles 700 parallel to the transversal direction "T" and cooperating with the plate 401 to define a clamp acting on the guide profiles 700.

More in detail, the first and the second clamping bars 800*a*, 800*b* are placed transversally to the longitudinal axis "L" below the plate 401 and they are secured to the plate 401 itself, for example screwed to it, by rigid connectors 904. In this situation, the first and the second clamping bars 800*a*, 800*b* and the plate 401 defines a clamping system configured to secure the bearing 400 to the pair of guide profile 700.

The method could also comprise a step of securing, through the clamp, each bearing 400 to the pair of guide profile 700 in a first position. During this step, the first and the second clamping bars 800*a*, 800*b* are brought closer to the plate 401 along the longitudinal axis "L" by the rigid connectors 904. In this situation, the ends of the first and the second clamping bars 800*a*, 800*b* abut the lower surfaces 700*b* while the plate 401 endorses on the upper surfaces 700*a* pinching the pair of guides 700.

Then, in case there is a need to adjust the position of the bearing 400, the method comprises a step of releasing the clamp so that the bearing 400 can slide on the upper surfaces 700*a* of the guide profiles 700*a* and a step of adjusting the position of the bearing 400 along from a first position to a second position.

More in detail, during the step of releasing, the first and the second clamping bars 800*a*, 800*b* are distanced, by the rigid connectors 904, from the lower surfaces 700*b* in such a way to release the clamping system allowing the plate 401 to slide along the upper surfaces 700*a*.

Once the second position is reached, the method comprises a step of securing, through the clamp, the bearing 400 to the pair of guide profile 700 in the second position.

Again, during the step of securing, the first and the second clamping bars 800*a*, 800*b* are brought closer to the plate 401 along the longitudinal axis "L" in such a way that the first and the second clamping bars 800*a*, 800*b* in cooperation with the plate 401 clamp the pair of guide profiles 700.

According to a preferred embodiment of the method, in order to let the each bearing 400 supports in a more efficient way a torque due, for example, to the distribution of the weight of the vehicle, the method also comprises a step of providing a coupling member 500.

More in detail, the coupling member 500 allows to counteracting the torque that may arises on the bearing 400 due to the distribution of the weight of the vehicle.

According to an aspect of the present disclosure, the coupling member 500 is integral to the canister 200.

The coupling member 500 is perpendicular to the longitudinal axis "L" and it is vertically distanced from the plate 401 along the longitudinal axis "L" in order to be positioned below the plate 401. In this situation, the method comprises a step of joining the coupling member 500 to the plate 401 in a vertically distanced position along the longitudinal axis "L".

The coupling member 500 includes an outer profile "P" counter-shaped to at least a part of the outer shape of the sleeve 404.

In this situation, the method also comprises the step of arranging the coupling member 500 in contact with an outer portion of the sleeve 404 to reduce, when in use, a torque acting on the plate 401.

The coupling member 500 operatively abuts to the sleeve 404 at the outer profile "P".

As shown in FIG. 5, the outer profile "P" is counter-shaped to at least a part of the outer surface of the sleeve 404.

For example, referring to FIG. 5, the outer profile "P" is at least counter-shaped to a portion of the lateral wall 404*a* of the sleeve 404 comprised between two consecutive connecting portions 405.

In particular, the coupling member 500 has a at least receiving portion "R" counter-shaped to at least part of the connecting portions 405.

Preferably, the coupling member 500 has two receiving portions "R" counter-shaped to respective smooth/rounded junction that connect the connecting portions 405 to the lateral wall 404*a*.

Preferably, the coupling member 500 and the sleeve 404 are coupled by a dovetail geometrical coupling in such a way to increase the bearing's 400 resistance to torsion and deformation.

The coupling member 500 conformation with respect to the conformation of the sleeve 404 allows to counteract the torque that may arises on the bearing 400 due to the distribution of the weight of the vehicle.

Moreover, the set of the coupling member 500, the sleeve 404 and the plate 401 allows to counteract the bending moment so that the cylinder remains vertical.

When the clamp is applied to the bearing 400, the coupling member 500 is integral to or connected to one of the clamping bars 800*a*, 800*b*. In this situation, the coupling member 500 abuts to an outer surface of the sleeve 404 at a longitudinal distance from the corresponding plate 401, as shown in FIG. 4A.

In order to avoid interference between the first and the second clamping bars 800*a*, 800*b* with the connecting member 500, the first and the second bracket 601, 602 are connected respectively with a rear side and a front side of the bearing 400. In this situation, the rear side and the front side are angularly offset with respect of the coupling member 500 in order to let the clamp system and/or the self-carrying system operates.

The solution according to one or more aspects of the present disclosure eliminates the drawbacks of the prior art.

In particular, the present invention provides an underfloor lifting platform 100 whose bearings 400 are two-parts-bearing that are more resistant to the torques acting on the underfloor lifting platform 100.

Moreover, the bearings 400 are easier to machine since no mould draft is needed.

Advantageously, the shape of the bearing 400, especially of the sleeve 404, allows to reinforce the bearings 400 in an efficient and easy way, for example by the coupling member 500.

Advantageously, the shape of the bearings 400 makes the bearings 400 themselves compatible with various systems such as self-carrying one. Moreover, the bearings 400 are easier to manufacture and mount on the underfloor lifting platform. Additionally, the bearings 400 could be assembled by anyone without special skills since the plate 401 and the sleeve 404 need to be simply screwed together.

The bearings 400 are easier to manage and, in particular, to storage as the can be assembled when needed.

We observe that FIGS. 4-6 are focused on illustrating the coupling member 500, whereas FIG. 7 is focused on illustrating the presence of the guide profiles 700. However, the embodiment shown in FIGS. 4A, 4B, and 6 and the embodiment shown in FIG. 7 can be combined. Indeed, the clamping bars 800*a* and 800*b* of FIG. 6 may weel be the same clamping bars 800*a* and 800*b* of FIG. 7. As shown in FIG. 7, the guide profiles 700 are clamped between the ends of the clamping bars 800*a* and 800*b*. As shown in FIG. 6, the coupling member 500 is located in the mid portion of the clamping bars 800*a* and 800*b*, while the ends of the clamping bars 800*a* and 800*b* are free from the coupling member 500. Hence, the clamping bars 800*a* and 800*b* can be used for clamping the guide profiles 700 and, at the same, they can be used for coupling to the sleeve 404 through the coupling member 500.

The invention claimed is:

1. An underfloor lifting platform for lifting vehicles, comprising:

- a canister, configured to be arranged underground to define an in-ground environment;
- a first and a second cylinder piston units, operatively arranged within the canister in an upside configuration with the piston edge abutting the bottom of the canister, the first and the second cylinder piston units being movable along a vertical direction;
- a first and a second bearing, operatively associated to an upper region of the canister and configured to slidably guide the cylinder liners of the first and a second cylinder piston units, respectively, in the movement of the first and the second cylinder piston units along the vertical direction, wherein each bearing comprises:

- a plate, including a central aperture, for receiving the cylinder liner in contact therethrough, and through holes surrounding the central aperture;
- a sleeve, elongated along a longitudinal axis and including a lateral wall, surrounding the longitudinal axis to define a passage for receiving the cylinder liner in sliding contact therethrough, and connecting portions integral to the lateral wall and surrounding the passage;
- connectors, operatively inserted into the through holes of the plate to engage the connecting portions of the sleeve positioned below the plate, so to fasten the plate to the sleeve, the underfloor lifting platform comprising a coupling member operatively integral with the canister and distanced from the plate along the longitudinal axis, the coupling member including:
- an outer profile counter-shaped to at least a part of the outer surface of the sleeve, wherein the coupling member operatively abuts to the sleeve at the outer profile, and
- a receiving portion counter-shaped to at least part of the connecting portions, the coupling member and the sleeve being coupled by a dovetail geometrical coupling.

2. The underfloor lifting platform according to claim 1, wherein the sleeve is provided as one piece through an extrusion along the longitudinal axis and wherein the connecting portions define ribs radially protruding from an outer surface of the lateral wall of the sleeve.

3. The underfloor lifting platform according to claim 1, comprising, for each bearing, a self-carrying system including:

- a first bracket connected to a surface of the plate facing the sleeve and to the sleeve;
- a second bracket connected the surface of the plate facing the sleeve and to the sleeve in such a way that the sleeve is interposed between the first and the second bracket;
- a base element interposed between the bottom of the canister and the piston edge;
- a first connector elongating from the first bracket to the base element;
- a second connector elongating from the second bracket to the base element;

wherein the coupling member is angularly offset around the longitudinal axis with respect to the first and the second bracket, so as to avoid a reciprocal interference between the coupling member and the first and second bracket.

4. The underfloor lifting platform according to claim 1, comprising a pair of guide profiles, wherein the guide profiles:

- are arranged fixed to the canister, elongate parallel to a horizontal axis belonging to a reference plane defined by the plate and perpendicular to the longitudinal axis,
- are reciprocally spaced along a transversal direction, the transversal direction being parallel to the reference plane and perpendicular to the horizontal axis,
- provide a pair of upper surfaces facing upwards in the longitudinal axis, wherein each bearing is located between the guide profiles in such a way that the corresponding plate lays on the upper surfaces so that the bearing can slide along the horizontal axis.

5. The underfloor lifting platform according to claim 4, comprising, for each bearing, a first clamping bar and a second clamping bar elongating parallelly to the transversal direction, wherein the guide profiles provide a pair of lower surfaces facing downwards in the longitudinal axis and located at a lower quote than the upper surfaces, the lower surfaces being configured to receive corresponding ends of the clamping bars, the clamping bars cooperating with the plate to lower and upper surfaces respectively, so to reversibly fasten the bearing to the guide profiles.

6. The underfloor lifting platform according to claim 5, comprising a coupling member operatively connected with the canister and distanced from the plate along the longitudinal axis, the coupling member including an outer profile counter-shaped to at least a part of the outer surface of the sleeve to abut thereto, wherein the coupling member is provided at or integral to one of the clamping bars.

7. The underfloor lifting platform according to claim 1, wherein the sleeve has an upper hollow tubular portion operatively inserted into the central aperture of the plate, the upper hollow tubular portion has an axial extension slightly higher than a thickness of the plate so that the upper hollow tubular portion has a circular rim arranged substantially flush with an upper surface of the plate.

8. A method for mounting a bearing in an underfloor lifting platform for lifting vehicles, the method comprising the following steps:

- providing a canister, configured to be arranged underground to define an in-ground environment;
- providing a first and a second cylinder piston units, operatively arranged within the canister in an upside configuration with the piston edge abutting the bottom of the canister, the first and the second cylinder piston units being movable along a vertical direction;

providing, per each cylinder piston units, a plate, including a central aperture, for receiving a cylinder liner in sliding contact therethrough, and through holes surrounding the central aperture;

providing, per each cylinder piston units, a sleeve elongated along a longitudinal axis and including a lateral wall, surrounding the longitudinal axis to define a passage for receiving the cylinder liner in sliding contact therethrough, and connecting portions integral to the lateral wall and surrounding the passage;

positioning each sleeve below the respective plate so that the connecting portions are arranged below the through holes of the plate;

fastening the plate to the connecting portions of the sleeve by means of connectors operatively inserted into the through holes (403) of the plate;

coupling each bearing on the corresponding cylinder piston units;

fixing each plate to the canister at the floor level.

9. The method according to claim 8, wherein the sleeve is manufactured as one piece by extrusion.

10. The method according to claim 8, comprising the following steps:

providing a coupling member including an outer profile counter-shaped to at least a part of the outer surface of the sleeve, the coupling member being integral to the canister;

joining the coupling member to the plate in a vertically distanced position along the longitudinal axis;

arranging the coupling member in contact with an outer portion of the sleeve to reduce, when in use, a torque acting on the plate.

11. The method according to claim 10, comprising the following steps:

providing, for each bearing, a self-carrying system including:

a first bracket connected to a surface of the plate facing the sleeve and to the sleeve;

a second bracket connected to the surface of the plate facing the sleeve and to the sleeve in such a way that the sleeve is interposed between the first and the second bracket;

a base element interposed between the bottom of the canister and the piston edge;

a first connector elongating from the first bracket to the base element;

a second connector elongating from the second bracket to the base element;

connecting the first and the second bracket respectively with a rear side and a front side of the bearing, wherein the rear side and the front side are angularly offset with respect of the coupling member.

12. The method according to claim 8, comprising the phases of:

providing a pair of guide profiles integral to the canister and both elongating along a horizontal axis laying on a reference plane orthogonal to the longitudinal axis, the pair of guide profiles being reciprocally spaced along a transversal direction parallel to the reference plane and perpendicular to the horizontal axis, the guide profiles defining a pair of upper surfaces and a pair of lower surfaces;

positioning the plate on the upper surfaces so that the bearing can slide along the horizontal axis;

providing a first and a second clamping bars elongating between the guide profiles parallel to the transversal direction and cooperating with the plate to define a clamp acting on the guide profiles;

through the clamp, securing the bearing to the pair of guide profile in a first position;

releasing the clamp so that the bearing can slide on the upper surfaces of the guide profiles and adjusting the position of the bearing along from the first position to a second position;

through the clamp, securing the bearing to the pair of guide profile in the second position.

13. The method according to claim 12, wherein, when the clamp is applied to the bearing, a coupling member provided at one of the clamp bars (800*a*, 800*b*) abuts to an outer surface of the sleeve at a longitudinal distance from the corresponding plate.

14. An underfloor lifting platform for lifting vehicles, comprising:

a canister, configured to be arranged underground to define an in-ground environment;

a first and a second cylinder piston units, operatively arranged within the canister in an upside configuration with the piston edge abutting the bottom of the canister, the first and the second cylinder piston units being movable along a vertical direction;

a first and a second bearing, operatively associated to an upper region of the canister and configured to slidably guide the cylinder liners of the first and a second cylinder piston units, respectively, in the movement of the first and the second cylinder piston units along the vertical direction, wherein each bearing comprises:

a plate, including a central aperture, for receiving the cylinder liner in contact therethrough, and through holes surrounding the central aperture;

a sleeve, elongated along a longitudinal axis and including a lateral wall, surrounding the longitudinal axis to define a passage for receiving the cylinder liner in sliding contact therethrough, and connecting portions integral to the lateral wall and surrounding the passage, the sleeve being positioned below the plate so that the connectors fasten the plate to the sleeve.

15. The underfloor lifting platform according to claim 14, comprising a pair of guide profiles, wherein the guide profiles:

are arranged fixed to the canister, elongate parallel to a horizontal axis belonging to a reference plane defined by the plate and perpendicular to the longitudinal axis, are reciprocally spaced along a transversal direction, the transversal direction being parallel to the reference plane and perpendicular to the horizontal axis, provide a pair of upper surfaces facing upwards in the longitudinal axis, wherein each bearing is located between the guide profiles in such a way that the corresponding plate lays on the upper surfaces so that the bearing can slide along the horizontal axis.

16. The underfloor lifting platform according to claim 15, further comprising a coupling member operatively integral with the canister and distanced from the plate along the longitudinal axis, the coupling member including an outer profile counter-shaped to at least a part of the outer surface of the sleeve, wherein the coupling member operatively abuts to the sleeve at the outer profile.

17. The underfloor lifting platform according to claim 15, comprising, for each bearing, a first clamping bar and a second clamping bar elongating parallelly to the transversal direction, wherein the guide profiles provide a pair of lower surfaces facing downwards in the longitudinal axis and located at a lower quote than the upper surfaces, the lower surfaces being configured to receive corresponding ends of the clamping bars, the clamping bars cooperating with the plate to lower and upper surfaces respectively, so to reversibly fasten the bearing to the guide profiles.

18. The underfloor lifting platform according to claim 17, comprising a coupling member operatively connected with the canister and distanced from the plate along the longitudinal axis, the coupling member including an outer profile counter-shaped to at least a part of the outer surface of the sleeve to abut thereto, wherein the coupling member is provided at or integral to one of the clamping bars.

19. An underfloor lifting platform for lifting vehicles, comprising:

a canister, configured to be arranged underground to define an in-ground environment;

a first and a second cylinder piston units, operatively arranged within the canister in an upside configuration with the piston edge abutting the bottom of the canister, the first and the second cylinder piston units being movable along a vertical direction;

a first and a second bearing, operatively associated to an upper region of the canister and configured to slidably guide the cylinder liners of the first and a second cylinder piston units, respectively, in the movement of the first and the second cylinder piston units along the vertical direction, wherein each bearing comprises:

a plate, including a central aperture, for receiving the cylinder liner in contact therethrough, and through holes surrounding the central aperture;

a sleeve, elongated along a longitudinal axis and including a lateral wall, surrounding the longitudinal axis to define a passage for receiving the cylinder liner in sliding contact therethrough, and connecting portions integral to the lateral wall and surrounding the passage;

connectors, operatively inserted into the through holes of the plate to engage the connecting portions of the sleeve positioned below the plate, so to fasten the plate to the sleeve, the underfloor lifting platform comprising:

a coupling member operatively integral with the canister and distanced from the plate along the longitudinal axis, the coupling member including an outer profile counter-shaped to at least a part of the outer surface of the sleeve, wherein the coupling member operatively abuts to the sleeve at the outer profile, and for each bearing, a self-carrying system, including:

a first bracket connected to a surface of the plate facing the sleeve and to the sleeve;

a second bracket connected the surface of the plate facing the sleeve and to the sleeve in such a way that the sleeve is interposed between the first and the second bracket;

a base element interposed between the bottom of the canister and the piston edge;

a first connector elongating from the first bracket to the base element;

a second connector elongating from the second bracket to the base element;

wherein the coupling member is angularly offset around the longitudinal axis with respect to the first and the second bracket, so as to avoid a reciprocal interference between the coupling member and the first and second bracket.

20. An underfloor lifting platform for lifting vehicles, comprising:

a canister, configured to be arranged underground to define an in-ground environment;

a first and a second cylinder piston units, operatively arranged within the canister in an upside configuration with the piston edge abutting the bottom of the canister, the first and the second cylinder piston units being movable along a vertical direction;

a first and a second bearing, operatively associated to an upper region of the canister and configured to slidably guide the cylinder liners of the first and a second cylinder piston units, respectively, in the movement of the first and the second cylinder piston units along the vertical direction, wherein each bearing comprises:

a plate, including a central aperture, for receiving the cylinder liner in contact therethrough, and through holes surrounding the central aperture;

a sleeve, elongated along a longitudinal axis and including a lateral wall, surrounding the longitudinal axis to define a passage for receiving the cylinder liner in sliding contact therethrough, and connecting portions integral to the lateral wall and surrounding the passage;

connectors, operatively inserted into the through holes of the plate to engage the connecting portions of the sleeve positioned below the plate, so to fasten the plate to the sleeve, the underfloor lifting platform comprising a pair of guide profiles, wherein the guide profiles:

are arranged fixed to the canister, elongate parallel to a horizontal axis belonging to a reference plane defined by the plate and perpendicular to the longitudinal axis, are reciprocally spaced along a transversal direction, the transversal direction being parallel to the reference plane and perpendicular to the horizontal axis, provide a pair of upper surfaces facing upwards in the longitudinal axis, wherein each bearing is located between the guide profiles in such a way that the corresponding plate lays on the upper surfaces so that the bearing can slide along the horizontal axis.

21. An underfloor lifting platform for lifting vehicles, comprising:

a canister, configured to be arranged underground to define an in-ground environment;

a first and a second cylinder piston units, operatively arranged within the canister in an upside configuration with the piston edge abutting the bottom of the canister, the first and the second cylinder piston units being movable along a vertical direction;

a first and a second bearing, operatively associated to an upper region of the canister and configured to slidably guide the cylinder liners of the first and a second cylinder piston units, respectively, in the movement of the first and the second cylinder piston units along the vertical direction, wherein each bearing comprises:

a plate, including a central aperture, for receiving the cylinder liner in contact therethrough, and through holes surrounding the central aperture;

a sleeve, elongated along a longitudinal axis and including a lateral wall, surrounding the longitudinal axis to define a passage for receiving the cylinder liner in sliding contact therethrough, and connecting portions integral to the lateral wall and surrounding the passage;

connectors, operatively inserted into the through holes of the plate to engage the connecting portions of the sleeve positioned below the plate, so to fasten the plate to the sleeve, wherein the sleeve has an upper hollow tubular portion operatively inserted into the central aperture of the plate, the upper hollow tubular portion has an axial extension slightly higher than a thickness of the plate so that the upper hollow tubular portion has a circular rim arranged substantially flush with an upper surface of the plate.

* * * * *